UNITED STATES PATENT OFFICE.

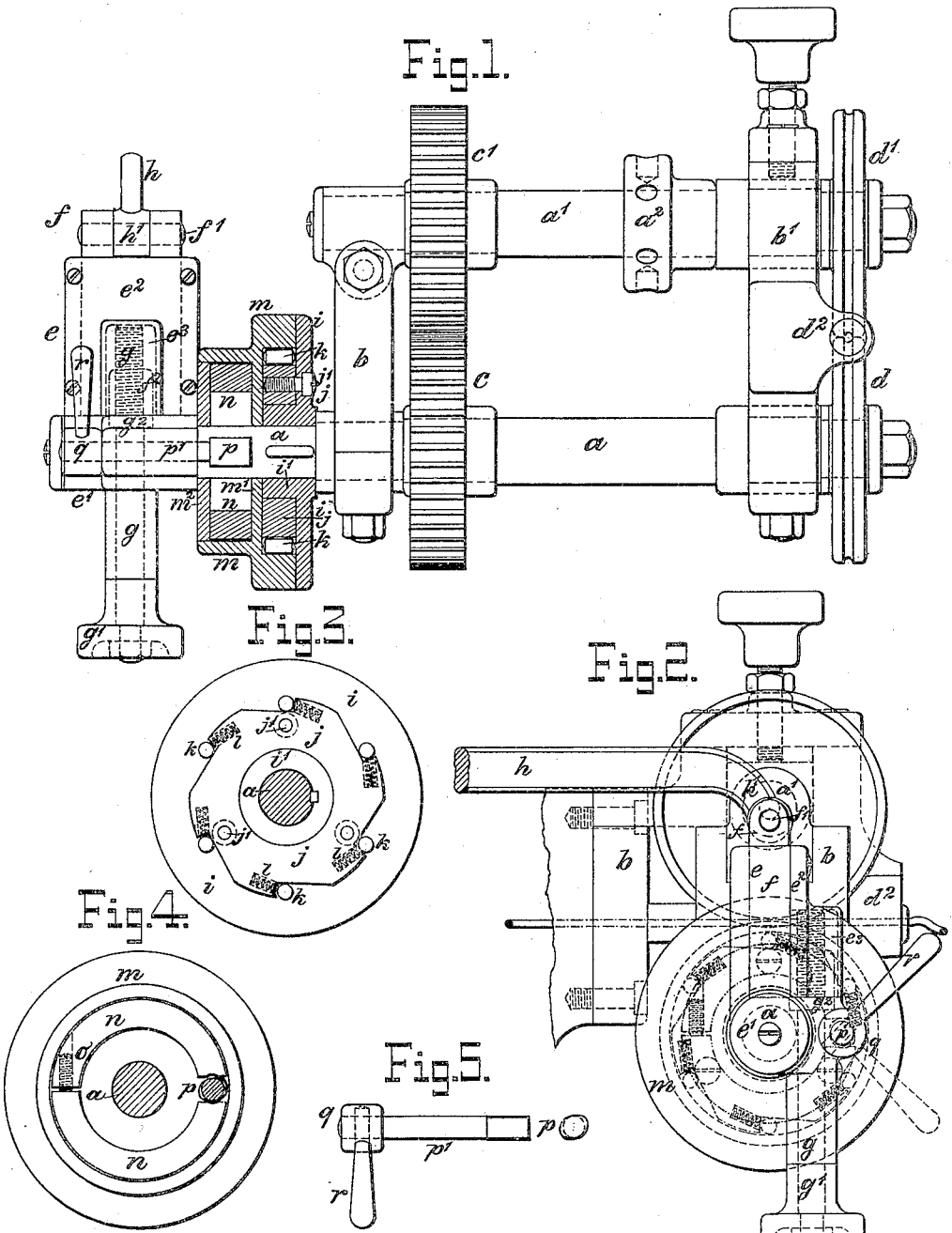

DWIGHT E. LYMAN, OF HARTFORD, CONNECTICUT.

INTERMITTENT GRIP DEVICE.

No. 821,301.  Specification of Letters Patent.  Patented May 22, 1906.

Application filed September 22, 1905. Serial No. 279,667.

*To all whom it may concern:*

Be it known that I, DWIGHT E. LYMAN, a citizen of the United States, residing at Hartford, in the county of Hartford and State of Connecticut, have invented a new and useful Intermittent Grip Device, of which the following is a specification.

This invention relates to improvements in clutches of that description by which the rotary movement of one member of a mechanism loosely mounted upon a shaft may be transmitted to another member of the mechanism secured to the shaft to effect the rotation of the shaft.

One object of my improvements is to provide a clutch by which continuous rotary movement in one direction only may be transmitted to the shaft from the member loosely mounted thereon, while movement of the loose member in the opposite direction will not actuate the shaft.

Another object of my improvements is to provide a clutch by which a vibratory movement of the member loosely mounted upon the shaft will effect the stepwise rotation of the shaft in one direction.

Another object of my invention is to provide, with a clutch capable of transmitting the continuous rotary movement of the member loosely mounted upon the shaft to the shaft in one direction only and also capable of transmitting the vibratory movement of the member loosely mounted upon the shaft to effect the stepwise rotation of the shaft, additional devices for at will actuating said clutch and for at will interrupting the actuation of the clutch.

Another object of my invention is to provide means for adjusting the devices for actuating the clutch.

These objects are attained by mechanism of simple and practical construction which is efficient, properly incased for its protection, and not liable to get out of order.

The embodiment of my improvements represented in the accompanying drawings is the feed mechanism of a machine for heading rivets or screws; but it will be understood that I do not intend to restrict the present invention to a feed mechanism, nor to any particular kind of machine, nor to the combination of the several features in a single structure.

In the accompanying drawings, Figure 1 is a front elevation of a screw or rivet heading machine, showing the feed mechanism embodying my invention partly in vertical central section. Fig. 2 is a side elevation of the forward portion of the machine. Fig. 3 is an end view of the part of the clutch fixed to the shaft, detached, exposing to view the interior thereof and the cam-disk contained therein. Fig. 4 is a similar end view of the part of the clutch-casing loosely mounted on the shaft and the friction-ring contained therein. Fig. 5 represents the cam-shaft, cam, and lever, detached, in a side and in an end view.

Similar letters refer to similar parts throughout the several views.

The left-hand end of the lower shaft of the feed mechanism represented in the drawings projects some distance beyond the bearing in the upright $b$, and upon this part of the shaft $a$ is mounted the mechanism for effecting the stepwise rotation of the two shafts in the direction for drawing in the wire between the feed-wheels $d\ d'$.

Upon the end of the shaft $a$ a slide-box $e$ is loosely seated, the lower end of the slide-box forming a hub $e'$, fitted to freely turn on the shaft, and a cap-disk fixed to the end of the shaft $a$, holding the slide-box $e$ upon the shaft. In the slide-box $e$ the slide $f$ is seated, being of rectangular form and its upper semicircular end projecting above the top of the slide-box. The rounded top of the slide $f$ is bifurcated and fitted with a horizontal pivot-pin $f'$, parallel to the shaft $a$. On its front near the lower end the slide $f$ carries a projecting semicircular boss $f^2$, through which a vertical threaded hole passes. A cap-plate $e^2$, secured by screws to the front of the slide-box $e$, closes the same and secures the slide $f$ therein, while allowing it to freely move vertically in the box. A forward projection on the cap-plate $e^2$ incloses the boss $f^2$ of the slide and provides clearance above the boss for the vertical adjustment of the slide $f$. The slide-box $e$ is provided in front of the hub $e'$ with a semicircular boss $e^3$, which is vertically in line with and forms a downward continuation of the projection on the cap-plate $e^2$, the boss $e^3$ extending vertically downward and some distance below the hub $e'$, this lower extension being cylindrical. In the boss $e^3$ the slide-box carries the adjusting-screw $g$. The lower smooth portion of the screw passes through the boss, and below the boss a handle $g'$ is fastened upon the screw $g$ and serves at will to turn the same. Recessed into the top of the boss $e^3$ the screw $g$ carries a fixed collar $g^2$, which, with the handle $g'$, confines the screw vertically in the slide-box $e$. The upper threaded portion of the screw $g$ fits into and passes through the threaded hole in the boss $f^2$ of the slide $f$, so that by turning the handle $g'$ and the screw $g$ the slide $f$ may be vertically adjusted in the slide-box $e$ and the pivot-pin $f'$ raised or lowered above the axis of the shaft $a$.

In the central recess of the projecting bifurcated upper end of the slide $f$ the forward end $h'$ of the connecting-rod $h$ is pivotally attached by the pivot-pin $f'$, thus forming a knuckle-joint between the rod and the slide, the rear end of the connecting-rod being connected, as usual, to the crank-pin on the end of the main driving-shaft of the machine. Rotation of the driving-shaft and crank produces a forward and rearward movement of the end $h'$ of the connecting-rod, and this produces a vibratory forward and rearward movement of the slide $f$ and slide-box $e$ on the shaft $a$ as fulcrum. By turning the handle $g'$ and the adjusting-screw $g$ and raising or lowering the slide and the pivot-pin $f'$ the limits of the vibratory movement of the slide-box upon the shaft may be adjusted, for though the amount of movement transmitted by the connecting-rod to the end of the slide $f$ remains the same the lengthening or shortening of the radial distance of the knuckle-joint, the point of transmission above the shaft $a$, results in shortening or lengthening the arc through which the slide-box is vibrated. The transmission in one direction of this adjustable vibratory movement from the slide-box to the shaft $a$ and to the shaft $a'$ and to the feed-wheels thereon results in adjusting the length of the wire fed at each step of rotation by the feed-wheels to the mechanism of the machine.

As far as described the parts of the machine and their operations are the usual ones and do not vary from those of well-known feed mechanisms of machines of this class, and they do not require to be further described or illustrated, as the present invention resides exclusively in the improved means for transmitting the movement from the slide-box to the shafts. Heretofore this object has been usually attained by securing a ratchet-wheel upon the shaft $a$ at the side of the slide-box $e$ and by providing a pawl or a series of pawls pivoted to the side of the slide-box over the ratchet-wheel. By turning the pawl into the operative position, in which its free end engages the teeth of the ratchet-wheel, the movement of the slide-box would be transmitted to the wheel and to the shaft in one direction, and this transmission could be at will interrupted by raising the pawl out of contact with the wheel and securing it in the inoperative position. This construction has several objectionable features. It cannot be applied without being subject to more or less loss of motion between the pawl and the wheel, it is not readily and easily changed while in motion from the operative to the inoperative position, and being entirely open and exposed it is liable to become clogged or injured. All of these drawbacks are entirely overcome by the substitution of my improved friction-clutch.

The clutch comprises two parts, of which one is loose and the other fixed on the shaft $a$. Both parts are inclosed in a casing and mounted side by side upon the shaft $a$ between the slide-box $e$ and the upright $b$. Nearest to the upright $b$ the flange $i$ is secured upon the shaft $a$, a spline seated in the shaft $a$ and fitting in the hub $i'$ of the flange, holding the flange against rotation on the shaft. Upon the outside of the hub $i'$ a disk $j$ is seated and secured by screws $j'$ to the flange $i$. In the periphery of the disk $j$ a series of recesses equal distances apart is cut, one end of each recess being substantially radial and the bottom of each recess extending at substantially a right angle from the radial end of the recess to the periphery of the disk. In looking at the disk from the left end of the shaft the bottom of each recess extends to the left side, as clearly shown in Fig. 3. While I have shown and described the disk $j$ as separate from the flange $i$ and fastened thereto, the disk may be integral with the flange; but I prefer to make it separate on account of its being easier to manufacture. In each of the recesses in the disk a roller $k$ is provided of a diameter which allows it to freely turn in the recess when near the radial end thereof; but if it is moved toward the left side upon the bottom of the recess the roller is caused to project beyond the periphery of the disk, and therefore to bind against any inclosing circular rim by which the disk $j$ may be surrounded. Central in the radial end of each of the recesses in the disk $j$ a hole is bored, penetrating some distance into the disk and forming a seat for a spiral spring $l$. The inner end of the spring rests against the bottom of the hole, while the outer end of the spring rests against the roller $k$. Thus the spring tends to force the roller away from the radial end of the recess and toward the shallower part of the recess. At the left side of the flange $i$ and between it and the slide-box $e$ the clutch-casing $m$ is loosely mounted upon the shaft $a$. The outer rim of the casing $m$ incloses the cam-disk $j$ and adjoins the flange $i$, the outside diameter of the rim being equal to that of the flange.

In the center of the clutch-casing $m$ is a transverse partition $m'$, which is seated loosely upon the shaft $a$ at the left of the cam-disk $j$ and of the hub $i'$ of the flange $i$. Between this partition and the slide-box $e$ the clutch-casing forms a chamber in which the expansible friction-ring $n$ is seated, and at the left side this chamber is closed by the circular cover-plate $m^2$, which, like the partition $m'$, is loosely fitted upon the shaft $a$. The friction-ring $n$, seated in the chamber of the casing $m$, is divided into two segmental parts. (See Fig. 4.) On one side of its center the ring is divided by a narrow radial cut, and a set-screw $o$ is fitted into one of the segments of the ring at right angles to the cut, and so that the end of the screw $o$ bears against the end of the other segment of the ring. By turning the screw $o$ the divided ring may be adjusted so as to closely fit in the chamber of the clutch-casing, but so as not to exert friction against the rim surrounding said chamber. At the opposite side the friction-ring $n$ is divided by a somewhat wider cut, and in it between the ends of the segments of the ring a cam $p$ is located. This cam is an integral part of the cam-shaft $p'$, which extends from the clutch-casing $m$ toward the outside of the slide-box $e$. A bearing for the cam-shaft $p'$ is provided in the slide-box on a line with and parallel to the bearing therein of the shaft $a$ and at a sufficient distance from the same to locate the cam $p$ between the ends of the segments of the friction-ring $n$. To the outer end of the cam-shaft $p'$ a hub $q$ and a hand-lever $r$ are attached, by means of which the cam-shaft and the cam may be turned about ninety degrees on their axis. The ends of the segments of the friction-ring $n$ above and below the cam $p$ have shallow recesses into which the cam enters when by turning the shaft and hand-lever it is turned to the operative position.

From the foregoing detailed description of the construction of the mechanism its operation will be readily understood. When the parts are in the position shown in the drawings and the hand-lever $r$ stands in the raised position, the cam is in the operative position, in which it expands the friction-ring, so that the vibratory or rocking movement imparted by the connecting-rod to the slide-box and by it to the cam-shaft, cam, and friction-ring is transmitted by the ring to the clutch-casing $m$, because the expanded friction-ring bears firmly against the casing. The springs $l$ pressing the rollers $k$ toward the shallow ends of the recesses in the cam-disk $j$, the rollers constantly bear against the rim of the clutch-casing $m$ surrounding them, and when the casing rocks in the direction toward the shallow ends of the recesses in the disk $j$ the rollers, wedging between the casing and disk, will at once cause the disk to be rotated with the casing, and the disk and flange $i$ being fixed on the shaft $a$ the shafts $a$ and $a'$ will be rotated a step in the direction to cause the feed-wheels $d$ $d'$ to feed the wire into the machine. When, however, on the reversed movement the slide-box, cam-shaft, cam, friction-ring, and clutch-casing rock in the opposite direction, the movement of the rim of the casing turning the rollers $k$ toward the deepest part of the recesses in the cam-disk $j$ at once causes the rollers to be freed and to release their wedging hold upon the rim of the casing and upon the cam-disk $j$, and thus allows the casing to move while the disk $j$, flange $i$, and shaft $a$ stand still. In this manner the vibratory movement of the slide-box is communicated to the shaft $a$ stepwise in one direction. On depressing the hand-lever $r$ to the position indicated by dotted lines in Fig. 2 the cam $p$ is moved to the inoperative position between the ends of the segments of the ring $n$, the friction-ring $n$, no longer expanded, releases its hold upon the clutch-casing, the casing stands still, and movement ceases to be transmitted to the disk $j$, flange $i$, and shafts $a$ and $a'$ until the hand-lever is again raised. The raising of the hand-lever is most conveniently effected while the slide-box rocks toward the right hand, the movement in this direction partly turning the handle upward if the same is simply prevented from rocking with the box. As the rocking of the slide-box toward the right is the part of the vibratory movement which is not communicated to the shafts of the machine, as heretofore explained, this arrangement insures that the clutch is thrown into action before the operative vibration toward the left begins and that the shafts $a$ and $a'$ will receive the full movement in that direction required in order that the feed-wheels will feed the regular length of wire to the machine. This arrangement prevents the first rivet or screw blank fed to the machine from being shorter than the regular length, a disturbing occurrence liable to happen if the feed mechanism were thrown into action while the slide-box rocks toward the left side—i. e., during the part of the movement to be transmitted by the clutch to the shaft.

While I have shown and described the two parts of the friction-clutch, the cam-disk, and the expansible friction-ring in coöperation, it is evident that these parts may be independently applied. The cam-disk and rollers fixed upon a shaft may be employed to transmit a continuous rotary movement in one direction to the shaft from a rim surrounding the rollers and disk. Said rim may be part of a pulley loosely mounted upon the shaft and rotated thereon by the side of the flange $i$ and disk $j$.

While I have shown and described a series of six recesses and rollers arranged in the periphery of the disk $j$, this number may be varied, one recess and roller even being sufficient to frictionally interlock the rim of the casing with the disk and flange in one direction; but by providing a series of recesses and rollers, as shown, the strain is symmetrically divided between all parts and a minimum amount of wear results.

A specially effective feature of my improvement consists in the arrangement of the spiral springs and their action upon the rollers in the recesses of the disk. Without the springs the action of the rollers would have to depend upon gravity for moving them toward the shallow parts of the recesses, and as this could be the case only with those rollers located on one side of the shaft a a small fraction only of the total number of rollers could be actuated and the entire strain would be thrown upon the parts on one side of the shaft. The springs will cause the rollers in all positions to be moved into operation, thus insuring quicker and more certain operation and dividing the strains symmetrically between all parts.

It will be seen that all parts of the clutch and of the means for actuating it are most perfecly incased and protected from disturbance or injury.

What I claim, and desire to cover by Letters Patent, is—

1. The combination, with a shaft, of a clutch, comprising a friction-casing loosely mounted on the shaft, said casing having a friction-rim and a chamber, a disk secured to the shaft, and inclosed by said friction-rim, and carrying automatic means for interlocking said disk with said friction-rim in one direction, and an expansible and adjustable friction-ring seated in said chamber, a box loosely mounted for rotation on said shaft by the side of said clutch, said box carrying means for expanding said friction-ring and for rotating the same, whereby vibratory movement imparted to said box may be transmitted to stepwise rotate said shaft in one direction.

2. The combination, with a shaft, of a clutch, comprising a casing loosely mounted on the shaft, said casing having a friction-rim and a chamber, a disk secured to the shaft and inclosed by said friction-rim and carrying automatic means for interlocking said disk with said friction-rim in one direction, and a friction-ring seated in said chamber, means carried by said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

3. The combination, with a shaft, of a clutch, comprising a casing loosely mounted on the shaft, said casing having a friction-rim, and a chamber, a disk secured to the shaft and inclosed by said friction-rim and carrying automatic means for interlocking said disk with said friction-rim in one direction, and a friction-ring seated in said chamber, a set-screw in said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

4. The combination, with a shaft, of a clutch, comprising a casing loosely mounted on the shaft, said casing having a friction-rim and a chamber, a disk secured to the shaft, and inclosed by said friction-rim, and carrying cam-recesses and rollers for interlocking said disk with said friction-rim in one direction, and a friction-ring seated in said chamber, a box loosely mounted for rotation on said shaft by the side of said clutch, said box carrying means for expanding said friction-ring and for rotating the same, whereby vibratory movement imparted to said box may be transmitted to stepwise rotate said shaft in one direction.

5. The combination, with a shaft, of a clutch, comprising a casing loosely mounted on the shaft, said casing having a friction-rim and a chamber, a disk secured to the shaft, and inclosed by said friction-rim, and carrying cam-recesses and rollers and springs for holding said rollers in operative position for interlocking said disk with said friction-rim in one direction, and a friction-ring seated in said chamber, a box loosely mounted for rotation on said shaft by the side of said clutch, said box carrying means for expanding said friction-ring and for rotating the same, whereby vibratory movement imparted to said box may be transmitted to stepwise rotate said shaft in one direction.

6. The combination, with a shaft, of a clutch, comprising a casing loosely mounted on the shaft, said casing having a friction-rim and a chamber, a disk secured to the shaft and inclosed by said friction-rim and carrying cam-recesses and rollers for interlocking said disk with said friction-rim in one direction, and a friction-ring seated in said chamber, means carried by said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

7. The combination, with a shaft, of a clutch, comprising a casing loosely mounted on the shaft, said casing having a friction-rim and a chamber, a disk secured to the shaft and inclosed by said friction-rim and carrying cam-recesses and rollers and springs for holding said rollers in operative position for interlocking said disk with said friction-rim in one direction, and a friction-ring seated in said chamber, means carried by said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

8. The combination, with a shaft, of a clutch, comprising a casing loosely mounted on the shaft, said casing having a friction-rim and a chamber, a disk secured to the shaft and inclosed by the friction-rim and carrying cam-recesses and rollers for interlocking said disk with said friction-rim in one direction, and a friction-ring seated in said chamber, a set-screw in said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

9. The combination, with a shaft, of a clutch, comprising a casing loosely mounted on the shaft, said casing having a friction-rim and a chamber, a disk secured to the shaft and inclosed by said friction-rim, and carrying cam-recesses and rollers and springs for holding said rollers in operative position for interlocking said disk with said friction-rim in one direction, and a friction-ring seated in said chamber, a set-screw in said friction-ring for adjusting the same, a box loosely mounted on said shaft by the side of said clutch, said box carrying means for expanding said friction-ring and for rotating the same, whereby vibratory movement imparted to said box may be transmitted to stepwise rotate said shaft in one direction.

10. The combination, with a shaft, of a box loosely mounted on the shaft, a rod pivotally connected with said box, a friction-casing loosely mounted on said shaft, and a disk secured to said shaft, said friction-casing having a rim surrounding said disk, and having a chamber containing a friction-ring, means carried by said box for rotating said friction-ring, and automatic means carried by said disk for interlocking said disk with said friction-casing in one direction, whereby vibratory movement imparted to said box by said rod will stepwise rotate said shaft in one direction, substantially as and for the purpose specified.

11. The combination, with a shaft, of a slide-box loosely mounted on the shaft, a slide supported in said slide-box, a rod pivotally connected with said slide, a friction-casing loosely mounted on said shaft, a disk secured to said shaft, said friction-casing having a rim surrounding said disk and having a chamber containing a friction-ring, automatic means for interlocking said disk with said friction-casing in one direction, operative connection of said slide-box with the friction-ring, whereby vibratory movement imparted to said slide-box by said rod will stepwise rotate said shaft in one direction, substantially as and for the purpose described.

12. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, operative connection of said slide-box with the friction-ring, automatic means for interlocking said disk with said friction-casing in one direction, whereby vibratory movement imparted to said slide-box by said rod will transmit adjustable stepwise rotation to said shaft in one direction, substantially as and for the purpose specified.

13. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, operative connection of said slide-box with the friction-ring, cam-recesses and rollers in said disk for interlocking said disk with said friction-casing in one direction, whereby vibratory movement imparted to said slide-box by said rod will transmit adjustable stepwise rotation to said shaft in one direction, substantially as and for the purpose specified.

14. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, operative connection of said slide-box with the friction-ring, cam-recesses and rollers and springs for moving said rollers into operative position in said disk, for interlocking said disk with said friction-casing in one direction, whereby vibratory movement imparted to said slide-box by said rod will transmit adjustable stepwise rotation to said shaft in one direction, substantially as and for the purpose specified.

15. The combination, with a shaft, of a slide-box loosely mounted on the shaft, a slide supported in said slide-box, a rod pivotally connected with said slide, a friction-casing loosely mounted on said shaft, a disk secured to said shaft, said friction-casing having a rim surrounding said disk and having a chamber containing a friction-ring, automatic means for interlocking said disk with said friction-casing in one direction, a cam and a cam-shaft carried by said slide-box for expanding and rotating said friction-ring, whereby vibratory movement imparted to said slide-box by said rod will stepwise rotate said shaft in one direction, substantially as and for the purpose described.

16. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, a cam and cam-shaft carried by said slide-box for expanding and rotating said friction-ring, automatic means for interlocking said disk with said friction-casing in one direction, whereby vibratory movement imparted to said slide-box by said rod will transmit adjustable stepwise rotation to said shaft in one direction, substantially as and for the purpose specified.

17. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, a cam and cam-shaft carried by said slide-box for expanding and rotating said friction-ring, cam-recesses and rollers in said disk for interlocking said disk with said friction-casing in one direction, whereby vibratory movement imparted to said slide-box by said rod will transmit adjustable stepwise rotation to said shaft in one direction, substantially as and for the purpose specified.

18. The combination, with a shaft, of a slide-box loosely mounted on the shaft, a slide supported in said slide-box, a screw for adjusting said slide in said box, a rod pivotally connected with said slide, a friction-casing loosely mounted on the shaft, a disk secured to said shaft, said friction-casing having a rim surrounding said disk and having a chamber containing a friction-ring, a cam and cam-shaft carried by said slide-box for expanding and rotating said friction-ring, cam-recesses and rollers and springs for moving said rollers into operative position in said disk, for interlocking said disk with said friction-casing in one direction, whereby vibratory movement imparted to said slide-box by said rod will transmit adjustable stepwise rotation to said shaft in one direction, substantially as and for the purpose specified.

19. The combination, with a shaft, of a clutch comprising a disk secured to the shaft and having cam-recesses and rollers and springs to hold said rollers in operative position in the recesses, a casing loose on the shaft and having a friction-rim surrounding said disk and rollers, and having a closed chamber, a friction-ring seated in said chamber, and a cam carried in said chamber for expanding and rotating said friction-ring, a box loosely mounted by the side of said clutch on said shaft, and carrying a cam-shaft and a hand-lever for turning said cam, whereby rotary movement imparted to said box may be transmitted in one direction to said shaft, and whereby all operative members of said clutch and the means for actuating said clutch, with exception of said hand-lever, are covered and incased.

20. The combination, with a shaft, of a clutch comprising a disk secured to the shaft and having cam-recesses and rollers and springs to hold said rollers in operative position in the recesses, a casing loosely mounted on the shaft and having a friction-rim surrounding said disk and rollers, and having a closed chamber, a friction-ring seated in said chamber, and a cam carried in said chamber for expanding and rotating said friction-ring, a box loosely mounted by the side of said clutch on said shaft, and carrying a cam-shaft and a hand-lever for turning said cam, whereby, on raising said hand-lever, rotary movement imparted to said box will be transmitted in one direction to said shaft.

This specification signed and witnessed this 18th day of September, A. D. 1905.

DWIGHT E. LYMAN.

In presence of—
C. J. EHBETS,
K. POWERS.